United States Patent [19]

Waldrip

[11] Patent Number: 5,036,617
[45] Date of Patent: Aug. 6, 1991

[54] FISHING LURE

[76] Inventor: Ralph Leland Waldrip, Route 1, Box 450, Amissville, Va. 22002

[21] Appl. No.: 495,085

[22] Filed: Mar. 19, 1990

Related U.S. Application Data

[63] Continuation-in-part of Ser. No. 182,234, Apr. 15, 1988, abandoned.

[51] Int. Cl.⁵ ................... A01K 97/04; A01K 85/00; A01K 85/01
[52] U.S. Cl. ........................... 43/41; 43/42.33; 43/42.31
[58] Field of Search ............ 43/42.31, 42.33, 41, 43/41.2, 42.32, 42.34, 42.35, 44.99, 43.14, 42.17

[56] References Cited

U.S. PATENT DOCUMENTS

| | | | |
|---|---|---|---|
| 2,127,761 | 8/1938 | Beck | 43/42.33 |
| 2,439,123 | 4/1948 | Bell | 43/41 |
| 2,510,566 | 6/1950 | Flaherty | 43/42.33 |
| 2,994,983 | 8/1961 | Best | 43/41 |
| 3,540,144 | 11/1970 | Gurka | 43/42.33 |
| 3,757,455 | 9/1973 | Strader | 43/42.17 |
| 4,163,338 | 8/1979 | Lucarini | 43/42.31 |

Primary Examiner—Kurt Rowan
Attorney, Agent, or Firm—Staas & Halsey

[57] ABSTRACT

A fishing lure has a hollow body and a closable end cap which can be snapped open or shut, or screwed on or off in order to insert live bait or cut bait into the hollow body. A variety of inserts receivable in the hollow body instead of live bait or cut bait include a hollow insert having a colored, textured outer surface which resembles live bait. The colored, textured surface of the hollow surface is visible from outside of the hollow body since the hollow body is made of clear plastic material. Other inserts include a noise-making insert which is receivable in the hollow insert and a filler insert which is receivable in the hollow insert instead of the noise-making insert. The hollow body may be made in a variety of shapes and sizes depending on the type of gamefish to be fished. The inserts are likewise variable in size and shape but are substantially of a shape to conform to inner surfaces of the hollow body and end cap.

16 Claims, 2 Drawing Sheets

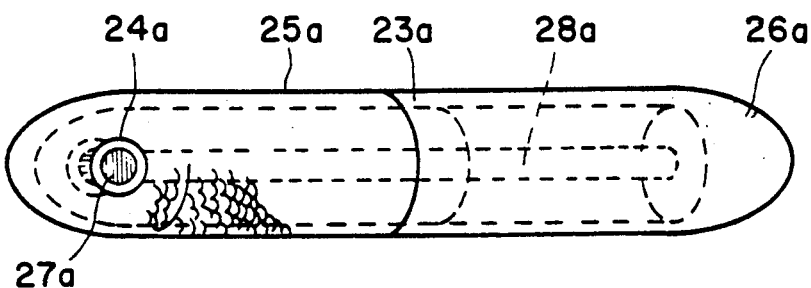
FIG. 7
FIG. 8
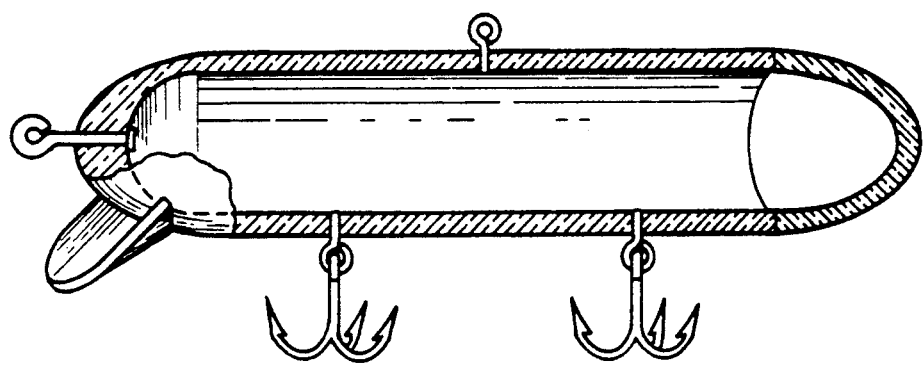
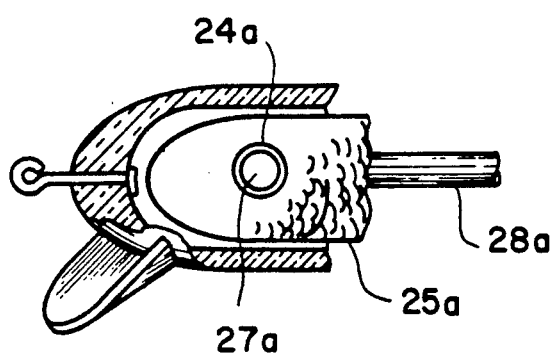
FIG. 9
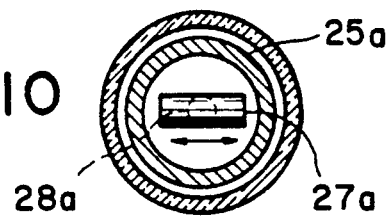
FIG. 10
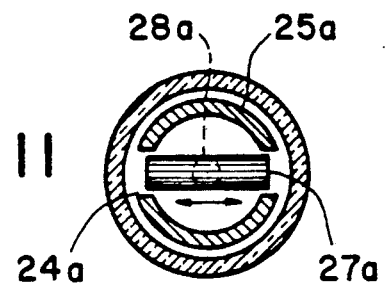
FIG. 11

FISHING LURE

This is a continuation-in-part of U.S. Ser. No. 07/182,234 filed Apr. 15, 1988 now abandoned.

BACKGROUND OF THE INVENTION

1. Field of the Invention

The present invention relates generally to the sport of fishing, and more particularly to a fishing lure having a hollow plastic body.

It is not uncommon for a fisherman to carry a myriad of fishing lures to accommodate different types of fish and different fishing environments. While the supply and variety of fishing lures on the market today are adequate, the need for many different types of fishing lures is somewhat impractical.

An additional problem associated with fishing lures is that, unlike live bait, fishing lures are unable to attract game fish by independent movement, except by action imparted by rod and line.

Traditional uses of live bait include skewering a worm, minnow, or other suitable bait onto a hook. Oftentimes, the bait becomes dislodged from the hook, or, gamefish, attracted to the live bait, are able to remove the bait from the hook without being caught.

SUMMARY OF THE INVENTION

An object of the present invention is to provide a fishing lure which is capable of provoking gamefish into striking through a combination of the overall appearance of the lure coupled with the appearance, smell and/or activity of the contents within the lure.

Another object of the invention is to provide a fishing lure which is easy to use and cost-effective to manufacture.

Yet another object of the invention is to provide a sturdy, clear plastic fishing lure having a hollow, ventilated body for containing live bait, cut bait, or artificial bait.

BRIEF DESCRIPTION OF THE DRAWINGS

FIG. 7 is a noise-making and eye-movement-emulating insert receivable in the hollow body of FIG. 4.

FIG. 8 is a cross-sectional view of second preferred embodiment of an outer casing of a fishing lure according to the present invention;

FIG. 9 is a detailed, side elevational view showing the insert of FIG. 7 placed inside the casing of FIG. 8.

FIG. 10 is a cross-sectional view showing an embodiment of the insert of FIG. 7 placed inside a ventilated casing such as the casing of FIG. 1, wherein the insert has clear windows which are struck by the laterally moving headed end of the sound generating mechanism according to the present invention.

FIG. 11 is a variation of the FIG. 10 embodiment in which the casing is non-ventilated, and the headed end of the sound generating mechanism passes through openings provided on opposite sides of the insert to strike the inner surface of the casing.

DETAILED DESCRIPTION OF THE DRAWINGS

Figure 1:
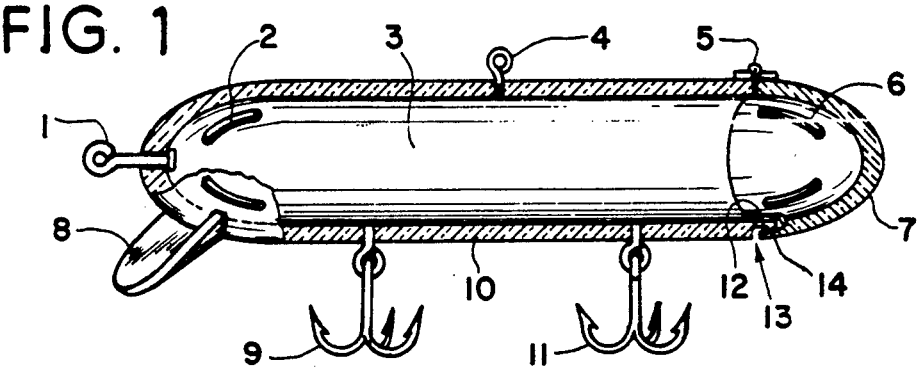
FIG. 1 is a cross-sectional view, partially in perspective, of a preferred embodiment of the present invention.
Figure 2:
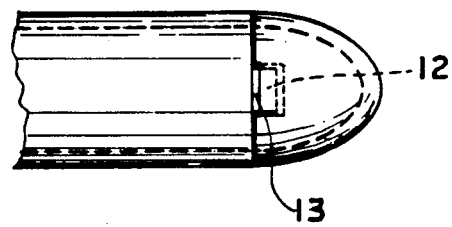
FIG. 2 is a bottom view of the rear-end portion of the FIG. 1 embodiment.

Referring to FIGS. 1 and 2, a fishing lure has a hollow body which is molded from a hard, clear plastic material having a molecular weight designed to cause the fishing lure to become buoyant just below the surface of the water when the hollow body is filled with water or a material of similar density. The preferred plastic for use in making the hollow body is LUCITE, which is a trademark of the DuPont Chemical Company or a polystyrene material.

The forward end of the fishing lure has a line attachment ring 1 embedded therein. A plurality of ventilation slots 2 disposed circumferentially around the oval, or substantially cylindrical body of the lure allow the inner cavity 3 to fill with water while the lure is in use. An additional line attachment ring 4 is provided in a medial, top portion of the body. The line attachment ring 4 is used with a drop-line and sinker, which are attachable to the line attachment ring 4, so as to tether the lure off the bottom for still-fishing near the bottom.

The opposite, rearward end portion of the body includes a cap 7 which pivots upwardly and downwardly by means of hinge 5 to allow for insertion and removal of inserts (to be described later). Cap 7 includes a plurality of circumferentially spaced ventilation slots 6 which act in a similar capacity as slots 2 in the opposite end. During normal use, as a line attached to line attachment ring 1 pulls the fishing lure, water circulates from the front end to the rearward end through slots 2 and 6; when the lure is stationary, of course, water flow can be in either direction.

A lip 8 is provided on a lower side of the forward end of the body. The lip 8 angles forwardly and has a slight curve shape so that while the lure is being pulled by a line attached to the line attachment ring 1, the lure moves in such a way as to simulate live bait movement. Hooks 9 and 11 hang downwardly from the bottom of the body. The body 10 is preferably thick enough to support the hooks 9 and 11, the line attachment rings 1 and 4, and the lip 8 without breaking apart under attack from toothy gamefish.

A latch mechanism is used to keep the cap 7 in the closed state shown in FIGS. 1 and 2. The latch mechanism includes a latch 12 having a hooked end. The latch 12 is integrally formed with the body 10. A complimentary latch 14 integrally formed with the cap 7 and having a hooked end springs into engagement with the latch 12 of the body 10. A gap 13 exposes the latch 12 so that, in order to open the cap 7, a user inserts a thumb nail or a blade into the gap 13 to push the latch 12 inwardly. This causes the hooked ends of the latches 12 and 14 to disengage from each other. When closing the cap 7, engagement of the two hooked ends is automatic when sufficient closing force is applied to overcome the spring force of the respective latches.

The hollow cavity 3 is designed to incarcerate live marine bait such as minnows, crayfish, worms, etc., for still-fishing either at the surface or, when rigged with a drop-line and sinker attached to the line attachment ring 4, tethered off the bottom. Water circulating through the body cavity 3 brings fresh water to the live bait inside the body cavity and bait aroma to nearby gamefish.

Figure 3:
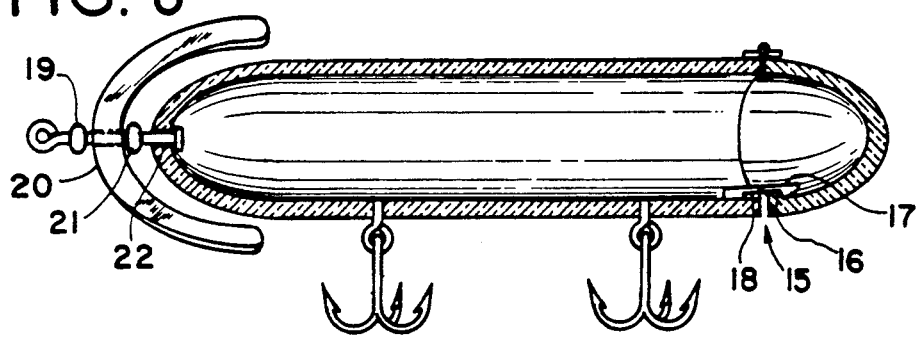
FIG. 3 is a cross-sectional view, partially in perspective, of another embodiment of the invention.

FIG. 3 shows an alternative embodiment of the fishing lure. While the body is substantially the same, a slightly different latching mechanism includes a hooked end 17 of a latch 18 which may be integrally formed with the body or it may be separately attached by adhesives or other attachment means. The hooked ends of the latch 17 engages a raised ridge 16 provided on an inner surface of the cap. A similar gap 15 is provided so that a user's thumbnail or a blade can be inserted to apply pressure to the latch 18 so as to push the hooked end 17 inwardly out of engagement with the raised ridge 16. The body shown in FIG. 3 is illustrated without ventilation slots. This is to illustrate that either embodiment of FIGS>1 or 3 could be used without the ventilation slots, although the options for usage become more limited.

In FIG. 3, the line attachment ring 22 is made longer than the one illustrated in FIG. 1 to accommodate impeller 20 which rotates about the line attachment shaft 22 between stops 19 and 21. The stops may be made of a low friction plastic such as polytetrafluoroethylene (PTFE). The impeller 20 on the front end of the fishing lure provides a fluttering and buzzing action which attracts gamefish. In the embodiment of FIG. 3, the lip 8 is not attached since the impeller 20 is performing the same function except with different results.

Figure 4:
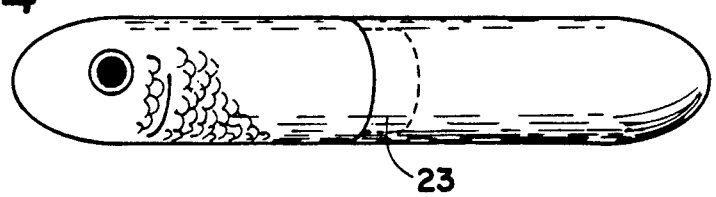
FIG. 4 is an insert receivable in the hollow bodies of either the FIG. 1 or FIG. 3 embodiments.

In FIG. 4, a hollow insert 23 is split in the middle in two halves and is capable of being assembled by a snap fit. The hollow insert 23 is inserted into the cavity 3 of the body 10 for the fishing lure of FIG. 1. The hollow insert 23 can be used a quick color change, artificial lure by placing the same within the cavity 3. The hollow insert 23 can be made of materials of different weight so as to change the buoyancy characteristics of the fishing lure. In other words, by using a material having a specific gravity greater than 1, the fishing lure can be made less buoyant in the water, and therefore, can be made to ride further from the surface of the water. Similarly, materials having a specific gravity of less than one can cause the lure to float higher. The hollow insert 23 can be finished in a variety or scale or smooth patterns which simulate live bait. Since the hollow insert is not exposed to the full force of water as the body 10 is pulled through the water, the hollow insert 23 tends to retain pheromone solutions longer since they are not directly washed off. The scaled finishes of the hollow insert are even more particularly well suited for carrying pheromone and maintaining the presence of the pheromone, since the scales forms small pockets. The hollow body insert 23 can be colored in a color shape and patterns including any or all popular fish attracting colors and patterns. The outer shape of the hollow insert 23 will match the body cavity 3 of the body 10, although slight variations are acceptable.

Figure 5:
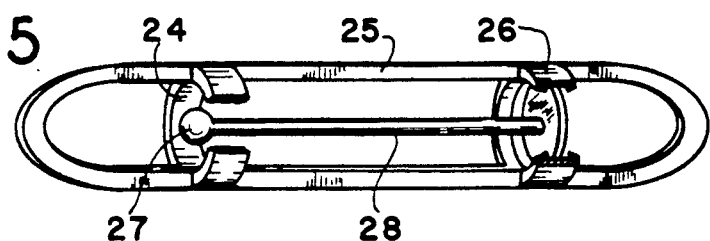
FIG. 5 is a noise-making insert receivable in the hollow body of FIG. 4.

FIG. 5 illustrates a noise mechanism which includes a skeletal frame 25 and rings 24 and 26. Ring 26 acts as a base for a clapper mounted in the ring and having a shaft 28 and a ball 27 at the end of the shaft. The side-to-side motion of the lure during retrieval of the lure causes the ball 27 to hit the ring 24, thereby making a ticking sound which is attractive to gamefish. Shaft 28 may be flexible and is capable of moving in an oscillating, reciprocating, or swiveling type movement. The structure shown in FIG. 5 is inserted into the hollow insert 23 of FIG. 4 which can then be inserted into the hollow cavities of either the FIG. 1 or FIG. 3 embodiments.

Figure 6:
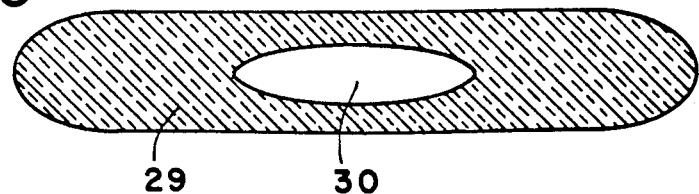
FIG. 6 is a buoyancy insert receivable in the hollow body of the FIG. 4 insert.

An alternative insert is illustrated in FIG. 6. The insert 29 is a filler body which may have a variable buoyance depending on whether a central core 30 is a hollow, air filled core, or is filled with lead or other relatively heavy material so as to lower the buoyancy by raising the weight. The insert 29 can be made of a plastic material of a suitable molecular weight. The molecular weight of the plastic can be selected to determine the buoyancy characteristics of the fishing lure.

FIG. 7 is another embodiment of the insert according to the present invention in which the noise-making mechanism also functions as an eye movement mechanism. Basically, the insert is a two-piece hollow body 25a joined together at a seam 23a by snap-fitting. The noise-making mechanism includes a flexible shaft 28a permanently embedded to a solid end portion 26a of the insert. The opposite end of the flexible shaft 28a is headed with either a spherical ball or a transversely mounted cylinder, or other suitably shaped structure. An opening 24a is provided on opposite sides of the insert so that the headed end 27a of the flexible shaft 28a moves back and forth through the openings to strike the inner surface of the outer casing. Alternatively, the openings 24a may be clear circular windows through which the headed end 27a can be seen moving. The headed end 27a would then strike the inner surface of the insert and thus generate the same sound as it would if it was striking the inner surface of the outer casing. In effect, the headed end 27a becomes the eye of the fishing lure, which moves as the fishing lure moves.

FIG. 8 is similar to FIG. 1 except that vents are not provided, and the end cap is fused on permanently during manufacturing by any suitable means, such as adhesive bonding.

Preferably, the insert shown in FIG. 7 is permanently installed in the casing of FIG. 8, as shown in FIG. 9. The headed end 27a taps directly against the clear outer casing or body through the holes on opposite sides of the insert.

The insert of FIG. 7 can be used in the ventilated casing of FIG. 1, in which case the pheromone can be used internally as described previously.

The insert of FIG. 7 can also be used in the fused casing shown in FIG. 8. When the insert is used in the fused body (in which there are not vents), the headed end of the shaft strikes the inner surface of the clear casing, whereas when the ventilated casing is used the headed end strikes the inner surface of the insert which has been provided with windows through which the headed end can be seen. Since the lower casing is sealed (i.e., no vents), the insert does not have to be used. Instead, the flexible shaft can be mounted by any suitable means in a rear portion of the casing, while the casing itself can be colored and contoured as desired to emulate real bait. In this case, windows can be provided on opposite sides so that the moving headed end 27a can be seen from outside the casing. The headed end 27a which strike the inner surface of the casing and thus provide a noise-making mechanism in addition to emulating eye movement.

The headed end 27a of the insert is counter-balanced by the weight of the solid end portion 26a so as to provide counterweight to the headed end 27a so that the lure floats level.

The headed end portion of the flexible shaft moves predominantly in an oscillating, lateral direction due to the fact that the fishing lure moves side-to-side due to the lip provided on the forward end of the hollow body. As the headed end portion moves side-to-side, it emulates eye movement of live bait. To enhance this fact, the sides of the headed end portion are painted to represent a minnows eyes.

The shaft which mounts the headed end is preferably flexible enough that when the fishing lure is allowed to rest, the headed end continues to move laterally for at least a short period, thus continuing to emulate eye motion while at the same time causing slight motions induced by reaction force of the headed end.

Numerous modifications and adaptations of the fishing lure of the present invention will be apparent to those so skilled in the art and thus it is intended by the following claims to cover all such modifications and adaptations which fall within the true spirit and scope of the invention.

What is claimed is:

1. A fishing lure comprising:
    a hollow, clear plastic body having an interior chamber and two opposite axial ends;
    a line attachment ring connected to one end of the hollow body,
    at least one hook connected to the hollow body, and
    an insert disposed in the interior chamber and being marked and colored to resemble line bait and including sound generating means,
    wherein the insert is hollow and has a shape substantially similar to that of the interior chamber of the hollow body, wherein the hollow insert comprises a hollow capsule made in two half portions connected end to end by a snap fit connection, and
    wherein the hollow insert has an exterior surface which is textured to simulate scales and is colored to simulate live bait coloring.

2. A fishing lure as claimed in claim 1, further comprising:
    a forwardly extending lip connected to the line attachment end of the hollow body for imparting non-linear movement to the fishing lure when being retrieved.

3. A fishing lure according to claim 1, wherein the body is vented and the hollow insert is treated with pheromone.

4. A fishing lure according to claim 1, wherein the sound generating means is receivable in the hollow insert and makes a clicking sound while the fishing lure is being retrieved.

5. A fishing lure according to claim 4, wherein the sound generating means comprises:
    a skeletal frame, a substantially axially disposed shaft having a ball at one end and being mounted to the skeletal frame at the opposite end, wherein the ball strikes a portion of the frame and makes a clicking sound as the fishing lure is being retrieved.

6. A fishing lure according to claim 1, wherein the line attachment ring has a shaft, and wherein the fishing lure further comprises:
    an impeller mounted for rotation on the shaft.

7. A fishing lure according to claim 1, further comprising:
    a filler insert receivable in the hollow insert and having a hollow core, the filler insert having a variable weight for adjusting the buoyancy of the fishing lure by selecting a material having a molecular weight to achieve a desired degree of buoyancy.

8. A fishing lure according to claim 1, further comprising:
    a filler insert having a lead core surrounded by a body made of a material having a molecular weight selected to achieve a desired level of buoyancy for the fishing lure in conjunction with the lead core.

9. A fishing lure according to claim 1, wherein the at least one hook comprise, two hooks connected to a bottom of the hollow body.

10. A fishing lure according to claim 1, wherein the at least one hook comprises a plurality of hooks, at least one of which is connected to the rear end of the body.

11. A fishing lure according to claim 1, wherein the sound generating means comprises a flexible shaft fixedly mounted in one end of the hollow insert and extending longitudinally towards the opposite end, the shaft having a headed distal end portion which moves as a result of movement of the body, the headed end portion striking a surrounding inner surface of the insert to thereby generate sound and emulate eye movement.

12. A fishing lure according to claim 1, wherein the sound generating means comprises a flexible shaft fixedly mounted in one end of the hollow insert and extending longitudinally towards the opposite end, the shaft having a headed distal end portion which moves as a result of movement of the body, the headed end portion striking an inner surface of the hollow body through openings provided on opposite sides of the insert so as to generate sound and emulate eye movement.

13. A fishing lure according to claim 11, wherein the headed end moves laterally from side-to-side as the fishing lure moves side-to-side due to a lip provided at the forward end thereof.

14. A fishing lure according to claim 11, wherein the insert includes a pair of clear windows on opposite sides of the headed end portion of the flexible shaft, so that the headed end portion is visible from outside the hollow body, and sound is generated by the headed end portion striking the clear windows.

15. An insert for a clear hollow bodied fishing lure comprising:
    a hollow shell having a shape substantially conforming to the shape of the fishing lure;
    a substantially axially disposed semi-flexible shaft fixedly mounted in one end of the hollow shell and having an opposite, headed end which swings laterally to emulate eye movement and which strikes a surrounding portion of the clear hollow bodied fishing lure through two holes provided in the hollow shell, thus making a clicking sound and simulating eye movement while the fishing lure is being retrieved.

16. An insert according to claim 15, wherein the headed end of the flexible shaft has a sufficient weight to generate small amounts of movement in the fishing lure after the lure is allowed to rest due to intertia and reaction force.

* * * * *